Oct. 29, 1946.　　A. B. NESBITT ET AL　　2,410,355
SEVERING TOOL
Filed Jan. 29, 1945　　2 Sheets-Sheet 1
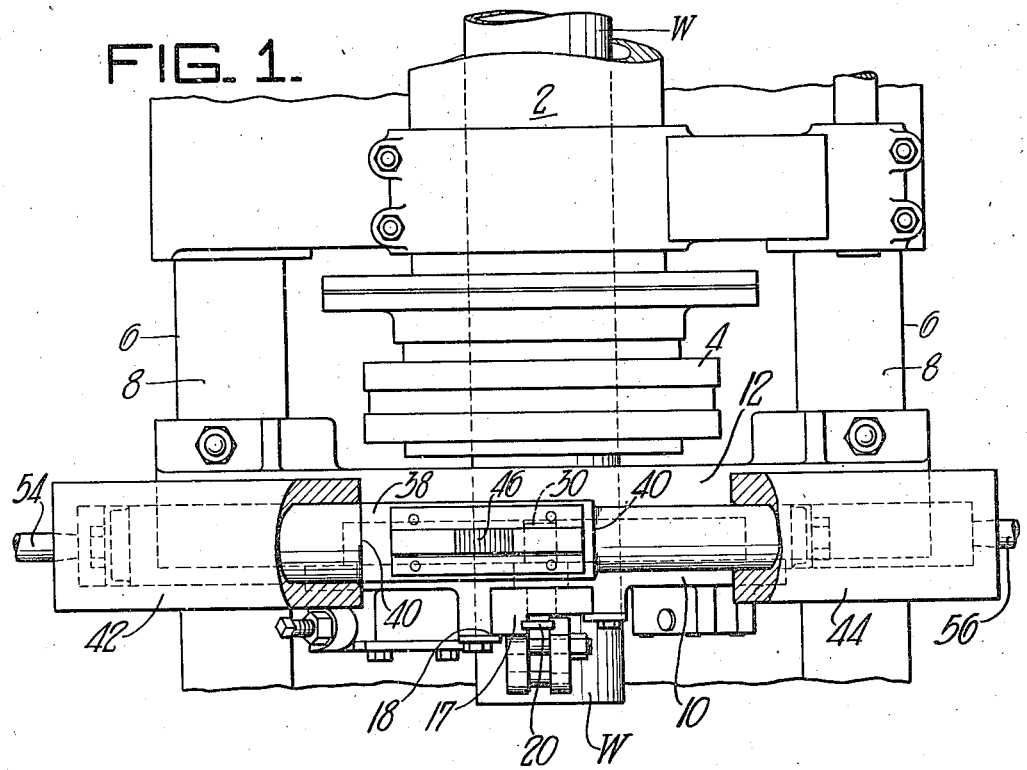
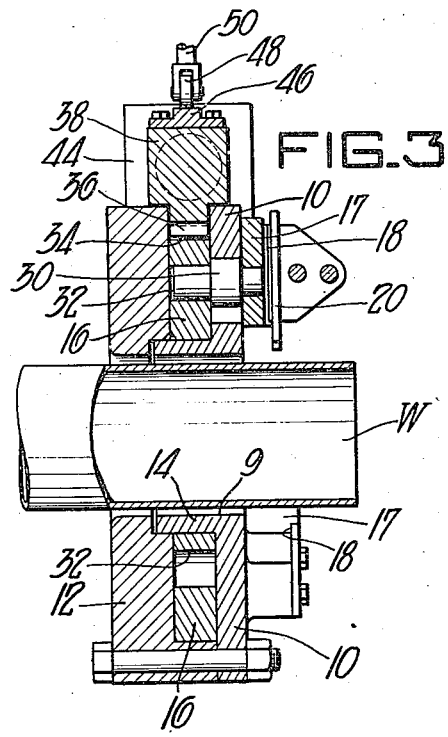
INVENTORS:
ANDREW B. NESBITT
and　SAMUEL WEBB,
BY: John E. Jackson
THEIR ATTORNEY.

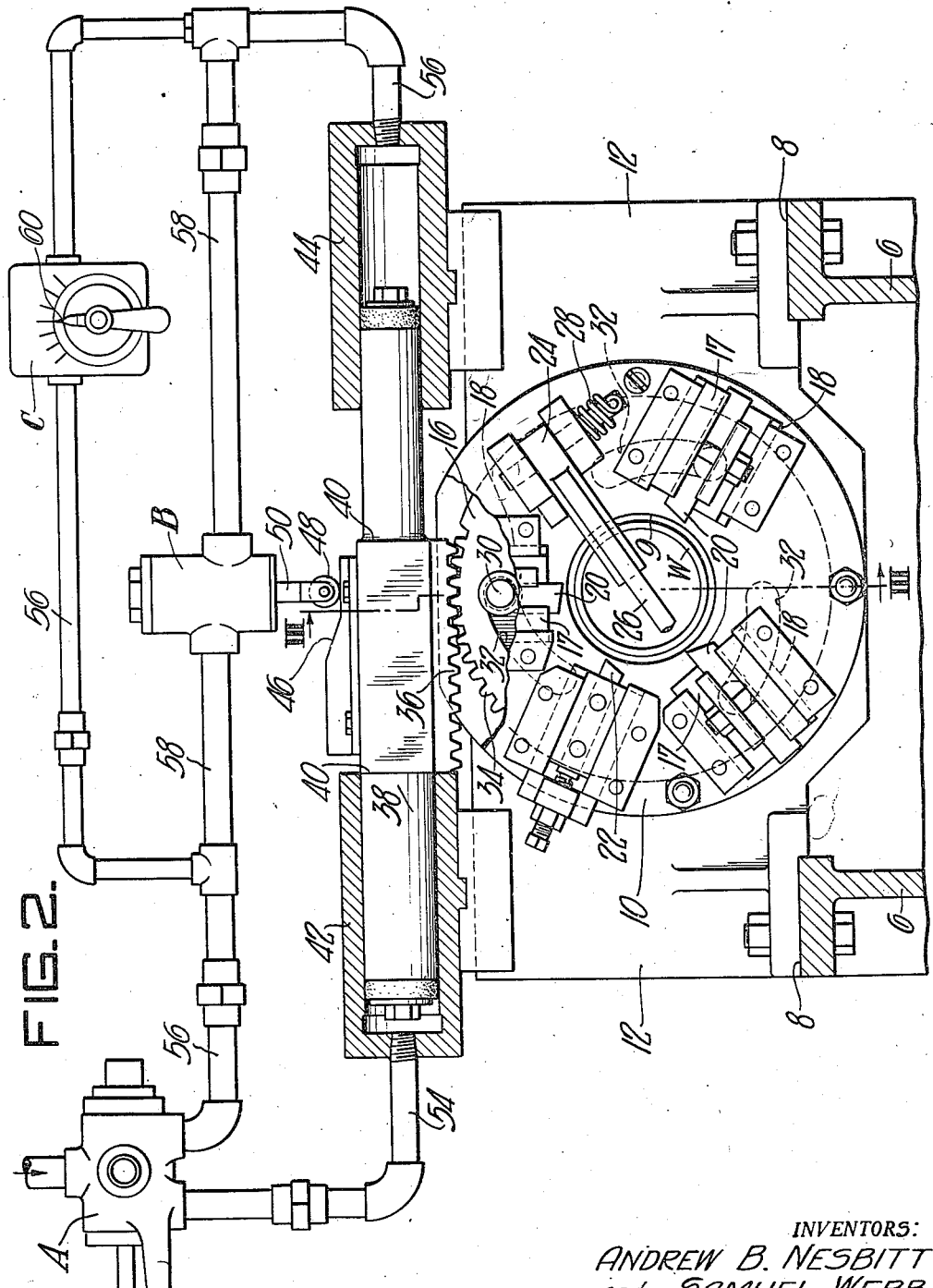

Patented Oct. 29, 1946

2,410,355

UNITED STATES PATENT OFFICE 2,410,355

SEVERING TOOL

Andrew B. Nesbitt and Samuel Webb, Pittsburgh, Pa., assignors to National Tube Company, a corporation of New Jersey Application January 29, 1945, Serial No. 575,104

5 Claims. (Cl. 164—36)

This invention relates to improvements in severing tools for cutting off crop ends from bar or pipe stock or for cutting such stock into short lengths and, more particularly, the invention relates to an improved manner of operating the cutter head carrying the severing tools.

It is an object of the present invention to provide a severing tool which is substantially automatic and at the same time which is rapid and efficient in operation.

The foregoing and further objects will be apparent from the specification and drawings, wherein:

Figure 1 is a plan view, partially in section;

Figure 2 is a front elevation, partially in section; and

Figure 3 is a cross-section on line III—III of Figure 2.

Referring more particularly to the drawings, the numeral 2 designates a conventional form of motor-driven rotatable spindle having a clutch controlled cam-operated chuck 4 adapted to grip a workpiece such as a length of pipe indicated by the letter W. Since the work-rotating spindle and chuck are of conventional form, they will not be further illustrated or described.

A longitudinally extending supporting frame 6 is anchored to a suitable foundation and carries ways 8. A face plate 10 having an opening 9 therethrough is mounted on the ways by a support 12. The face plate 10 has a central rearwardly extending bearing portion 14 on which there is rotatively mounted between the face plate 10 and support 12, a cam plate 16. Slidably mounted on the face plate 10 on holders 17 in slideways 18, are three unevenly spaced cutters 20, a similarly mounted chamfering tool 22 and pivotally mounted reaming tool 24. The reaming tool 24 is adapted to be hand operated and pulled into working position by a handle 26 from a normal outwardly extending position to which it is yieldingly urged by a spring 28.

The cutters 20 and chamfering tool 22 are positioned in their respective slideways 18 by pins 30 extending outwardly from both sides of the face plate 10 so that one end rigidly engages tool holders 17 and the other slidably engages slots 32 in cam plate 16. The slots 32, which are disposed rearwardly of the tool holders 17, are arcuately shaped and have a spiral-like or eccentric disposition so that one end is nearer the axis of the cam plate than the other end. Accordingly, it is seen that rotation of the cam plate 16 will cause the tool holders 17 and the tools 20 and 22 held thereby to move radially toward or away from the axis or center of the face plate 10.

The cam plate 16 has a gear segment 34 on the upper side thereof which is in engagement with a rack 36. The rack 36 is mounted on the lower side of a horizontally disposed plunger 38, having shoulders 40 thereon, which is actuated by two single acting hydraulic cylinders 42 and 44. Stroke of the plunger 38 is limited and controlled by shoulders 40 engaging the inner ends of cylinders 42 and 44.

A cam 46 is mounted on the upper side of the plunger 38 and a follower 48 on the lower end of a reciprocating valve plunger 50 in a valve B is spring-biased into engagement therewith. The function of the valve B will be described hereinafter.

The rear end of cylinder 42 is connected directly to a 4-way valve A by a line 54. The rear end of cylinder 44 is connected to the opposite side of the valve A by line 56 having a shunt 58 therein. A fluid metering or control valve C having a dial setting gauge 60 is disposed in line 56 and the aforementioned valve B is contained in the shunt 58. Valve B is provided with a check valve which permits fluid to pass freely therethrough in a left to right direction. A pump (not shown) is connected to the foregoing hydraulic circuit through the 4-way valve A. Fluid pressure from the pump may thus be admitted selectively to line 54 or 56 and shunt 58 to move the plunger 38 as desired.

The control valve C is composed of a constant pressure valve and a variable opening valve, the setting of which is registered on the dial 60.

In operation with a workpiece disposed in position to be cut, valve A is operated to admit fluid under pressure to line 54 to move plunger 38 to the right as shown in Figure 2 of the drawings. Fluid is exhausted from the cylinder 44 through shunt 58 and valve B allowing rapid movement of the plunger until the cutting tools 20 closely approach the workpiece by reason of the rack 36 rotating the cam wheel 16. By reason of this movement, the cam 46 also moves to the right lifting the follower 48 and plunger 50 to close the valve B as the cutting tools approach the workpiece. Thereafter the fluid exhausting from cylinder 44 must pass through the control valve C which is set to control the passage of fluid therethrough to the rate which will permit the plunger 38 to move at the speed which will move the cutting tools into the workpiece at the desired rate.

After the tools 20 have passed completely through the workpiece and the tool 22 has chamfered the edge thereof, the reaming tool 24 is brought into engagement with the end of the workpiece to ream the inside edge thereof. Thereafter the valve A is operated to reverse the flow of the fluid whereby fluid is passed through the check valve of valve B into the outer end of cylinder 44 and is exhausted from the outer end of cylinder 42 to rotate the cam plate 16 to open the tools 20 and 22 to their widest position so that the workpiece W may be repositioned or another workpiece may be positioned therein.

While we have shown and described one specific embodiment of our invention, it will be understood that this embodiment is merely for the purpose of illustration and description and that various other forms may be devised within the scope of our invention, as defined in the appended claims.

We claim:

1. A machine tool for severing elongated bar or pipe stock, comprising means for rotating the stock on its longitudinal axis, a tool support having an opening therethrough adapted to encompass said stock while held by said rotating means, a plurality of cutting tools slidably mounted on said support for movement transversely and radially of the longitudinal axis of said stock, rotatable cam means for moving said cutting tools transversely and radially of said stock, means to rotate said cam means, said means comprising at least an hydraulic cylinder, means for admitting fluid under pressure thereto to rotate said cam and move said tools inwardly of said support, means for controlling the rate of exhaust therefrom to control the speed of advance of said tools, said means comprising a variable control valve and a shunt, a shut-off valve in said shunt and means operable to close said shut-off valve when said tools are moved adjacent said stock whereby said tools may be moved rapidly inwardly until they approach said stock and are thereafter moved inwardly at a rate controlled by said variable control valve.

2. A machine tool for severing elongated bar or pipe stock, comprising means for rotating the stock on its longitudinal axis, a tool support having an opening therethrough adapted to encompass said stock while held by said rotating means, a plurality of cutting tools slidably mounted on said support for movement transversely and radially of the longitudinal axis of said stock, a rotatable cam plate for moving said cutting tools transversely and radially of said stock, means to rotate said cam plate, said means comprising a gear segment on said rotatable cam plate, a rack engaging said gear segment, a pair of opposed hydraulic cylinders connected to the opposite ends of said rack for reciprocating the same, means for admitting fluid under pressure to one of said cylinders to thereby move said tools inwardly of said support, means controlling the rate of exhaust of fluid from the other of said cylinders to control the speed of movement of said rack, said means comprising a variable control valve and a shunt, a shut-off valve therein, a cam follower operatively connected to said shut-off valve, a cam on said rack engaged by said follower to shut off said valve after said rack has moved a predetermined distance to bring said tools adjacent said stock whereby said tools may be moved rapidly inwardly until they approach said stock and are thereafter moved inwardly at a slower and controlled rate of speed.

3. A machine tool for severing elongated bar or pipe stock, comprising means for rotating the stock on its longitudinal axis, a tool support having an opening therethrough adapted to encompass said stock while held by said rotating means, a plurality of cutting tools slidably mounted on said support for movement transversely and radially of the longitudinal axis of said stock, a rotatable cam plate for moving said cutting tools transversely and radially of said stock, means to rotate said cam plate, said means comprising a gear segment on said rotatable cam plate, a rack engaging said gear segment, a pair of opposed hydraulic cylinders for reciprocating said rack, means for admitting fluid under pressure to one of said cylinders to move said tools inwardly of said stock, means controlling the rate of exhaust of fluid from the other of said cylinders, said means comprising a variable control valve and a shunt, a shut-off valve in said shunt and means responsive to the movement of said rack to close said shut-off valve whereby said tools may be moved rapidly inwardly until they approach said stock and are thereafter moved inwardly at a slower and controlled rate.

4. A machine tool for severing elongated bar or pipe stock, comprising means for rotating the stock on its longitudinal axis, a tool support having an opening therethrough adapted to encompass said stock while held by said rotating means, a plurality of cutting tools slidably mounted on said support for movement transversely and radially of the longitudinal axis of said stock, rotatable cam means for moving said cutting tools transversely and radially of said stock, means to rotate said cam means, said means comprising at least one hydraulic cylinder, means for admitting fluid under pressure thereto to move said tools inwardly of said support, means for controlling the rate of exhaust of fluid therefrom to control the speed of advance of said tools, said means comprising a variable control valve and a shunt, a shut-off valve in said shunt, a cam follower operatively connected to said shut-off valve, a cam operable by said hydraulic means engaged by said follower to shut off said shut-off valve when said tools are moved adjacent said stock whereby said tools may be moved rapidly inwardly until they approach said stock and are thereafter moved inwardly at a slower and controlled rate of speed.

5. A machine tool for severing elongated bar or pipe stock, comprising means for rotating the stock on its longitudinal axis, a tool support having an opening therethrough adapted to encompass said stock while held by said rotating means, a plurality of cutting tools slidably mounted on said support for movement transversely and radially of the longitudinal axis of said stock, rotatable cam means for moving said cutting tools transversely and radially of said stock, means to rotate said cam means, said means comprising at least one hydraulic cylinder connected thereto, means for admitting fluid under pressure thereto to move said tools inwardly of said support, means for controlling the rate of exhaust of fluid therefrom to control the speed of advance of said tools, said means comprising a variable control valve and a shunt, a shut-off valve in said shunt and means responsive to the movement of said rotating means to close said shut-off valve whereby said tools may be moved rapidly inwardly until they approach said stock and are thereafter moved inwardly at a slower controlled rate.

ANDREW B. NESBITT.
SAMUEL WEBB.